United States Patent
Gorman et al.

(10) Patent No.: US 11,950,091 B2
(45) Date of Patent: Apr. 2, 2024

(54) COMMUNICATION SYSTEM AND METHOD

(71) Applicant: Transportation IP Holdings, LLC, Norwalk, CT (US)

(72) Inventors: Joseph Gorman, Cedar Rapids, IA (US); Scott Sollars, Marion, IA (US); Timothy Allen Schultz, Marion, IA (US); Christopher Claussen, Cedar Rapids, IA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 14 days.

(21) Appl. No.: 17/230,738

(22) Filed: Apr. 14, 2021

(65) Prior Publication Data

US 2021/0329448 A1 Oct. 21, 2021

Related U.S. Application Data

(60) Provisional application No. 63/010,189, filed on Apr. 15, 2020.

(51) Int. Cl.
*H04L 29/06* (2006.01)
*H04L 9/06* (2006.01)
(Continued)

(52) U.S. Cl.
CPC ......... *H04W 12/033* (2021.01); *H04L 9/0643* (2013.01); *H04W 12/0431* (2021.01); *H04W 12/0433* (2021.01); *H04L 9/14* (2013.01)

(58) Field of Classification Search
CPC ........... H04W 12/033; H04W 12/0431; H04W 12/0433; H04W 12/041; H04W 12/047;
(Continued)

(56) References Cited

U.S. PATENT DOCUMENTS 8,305,936 B2  11/2012  Wang
9,842,263 B2  12/2017  Kim et al.
(Continued)

FOREIGN PATENT DOCUMENTS

WO   2020140257 A1   7/2020

OTHER PUBLICATIONS

Requisition by the Examiner for corresponding CA Application No. 3,114,296 dated Mar. 22, 2023 (8 pages).

*Primary Examiner* — Malcolm Cribbs
(74) *Attorney, Agent, or Firm* — Mary D. Lawlor; The Small Patent Law Group, LLC (57) ABSTRACT

A system and a method include an onboard communication system configured to be disposed onboard a vehicle system and comprising one or more processors. The one or more processors may generate a session key that includes a shared secret key that is known by the onboard communication system and an off-board communication system, generate one or more encryption keys by hashing the session key with an identifier based on a cycle time that is known by the onboard communication system and the off-board communication system, generate one or more encrypted messages by encrypting one or more messages associated with one or more of the vehicle system or a route over which the vehicle system moves based on the one or more encryption keys, and communicate the one or more encrypted messages from the onboard communication system to the off-board communication system.

20 Claims, 3 Drawing Sheets

(51) Int. Cl.
*H04W 12/033* (2021.01)
*H04W 12/0431* (2021.01)
*H04W 12/0433* (2021.01)
*H04L 9/14* (2006.01)

(58) Field of Classification Search
CPC ..... H04L 9/0643; H04L 9/14; H04L 2209/84; H04L 9/0841; H04L 9/0872; H04L 9/12
See application file for complete search history.

(56) References Cited

U.S. PATENT DOCUMENTS

| | | |
|---|---|---|
| 10,501,055 B1* | 12/2019 | Yi .................. B60R 25/257 |
| 11,595,515 B2* | 2/2023 | van Rensburg ... H04M 3/42068 |
| 2019/0191301 A1* | 6/2019 | Fang ...................... H04L 9/30 |
| 2020/0169400 A1* | 5/2020 | Thaler, III ............ G06F 21/602 |
| 2020/0327252 A1 | 10/2020 | McFall et al. |
| 2020/0366479 A1* | 11/2020 | Lee ...................... H04L 9/0894 |
| 2021/0173917 A1* | 6/2021 | Cheng ................ H04L 9/3247 |
| 2021/0266988 A1* | 8/2021 | Staats ................ H04W 12/06 |

* cited by examiner

COMMUNICATION SYSTEM AND METHOD

CROSS-REFERENCE TO RELATED APPLICATIONS

This application claims priority to U.S. Provisional Application No. 63/010,189, filed Apr. 15, 2020, and is incorporated by reference herein in its entirety.

BACKGROUND

Technical Field

The subject matter described relates to communication systems and methods.

Discussion of Art.

Safeguards or security measures may be taken to ensure secure communication between two or more systems. One example of a safeguard system may be systems that generate and communicate using a Diffie-Hellman shared key. For example, a shared key may be established by two systems that may allow the two systems to transmit secure communications using the shared key. Secure communication may occur between two systems, such as between a vehicle system and an off-board control system, between two or more vehicles such as in two different vehicle systems, between a vehicle and another wayside device, or the like.

One technical problem of existing security communication systems is that once a shared key is established, the two systems may communicate for a predetermined length of time using only the shared key that was generated at the start of a communication session. For example, the shared key may be the only safeguard in place to ensure secure communication. In the example of the vehicle system communicating with an off-board control system, the vehicle system may communicate with the off-board control system during the entire length of time that the vehicle system is traveling, that may be minutes, hours, or even days. A motivated individual could potentially defeat the security system having only the single shared key safeguard in place.

BRIEF DESCRIPTION

In one or more embodiments, a system includes an onboard communication system configured to be disposed onboard a vehicle system and comprising one or more processors. The one or more processors may generate a session key that includes a shared secret key that is known by the onboard communication system and an off-board communication system, generate one or more encryption keys by hashing the session key with an identifier based on a cycle time that is known by the onboard communication system and the off-board communication system, generate one or more encrypted messages by encrypting one or more messages associated with one or more of the vehicle system or a route over which the vehicle system moves based on the one or more encryption keys, and communicate the one or more encrypted messages from the onboard communication system to the off-board communication system.

In one or more embodiments, a method includes generating a session key that includes a shared secret key that is known by an onboard communication system and an off-board communication system. The onboard communication system is disposed onboard a vehicle system. The method also includes generating one or more encryption keys by hashing the session key with an identifier based on a cycle time that is known by the onboard communication system and the off-board communication system, generating one or more encrypted messages by encrypting one or more messages associated with one or more of the vehicle system or a route over which the vehicle system moves based on the one or more encryption keys, and communicating the one or more encrypted messages from the onboard communication system to the off-board communication system.

One or more embodiments relate to a method for securing communication between an onboard communication system and an off-board communication system. The onboard communication system is disposed onboard a vehicle system. The method includes generating one or more encryption keys based at least in part on information that is known by both the onboard communication system and the off-board communication system, generating one or more encryption messages by encrypting one or more messages associated with one or more of the vehicle system or a route over which the vehicle system moves based on the one or more encryption keys, and communicating the one or more encrypted messages between the onboard communication system and the off-board communication system. The one or more encrypted messages include information about one or more of the vehicle system or the route over which the vehicle system is configured to move.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods for securing communication between two communication systems. One system may be a communication system onboard a vehicle system, and the other system may be an off-board communication system, such as at an off-board control system, a route wayside device, or the like. Communication messages may be secured via two measures of security. A first measure of security may be a shared secret key that may be determined by the two communication systems without being broadcasted. A second measure of security may be in one or more encryption keys that may be generated based on a cycle time. The cycle time may be a time-based cycle time, a location-based cycle time, or a combination of a time-based and location-based cycle time. As one example, the cycle time may be a time-based cycle time, and a new encryption key may be generated every interval of time associated with the cycle time (e.g., every minute, every five minutes, every hour, or the like). Optionally, the cycle time may be a location-based cycle time, and a new encryption key may be generated every interval of location associated with the cycle time (e.g., after the vehicle system moves a predetermined number of miles, responsive to the vehicle system moving out of one geospatial area and into another, such as crossing a county or state line).

The communication system onboard the vehicle system and the communication system off-board the vehicle system may generate encrypted messages using the shared secret key and the encryption key to encrypt one or more messages that may be communicated with the system. For example, the encrypted messages may be encrypted based on two security measures. In one or more embodiments, the onboard communication system may generate an encrypted message by encrypting a message using the shared secret key and the encryption key (based on the cycle time). The onboard communication system may communicate the encrypted message with the off-board communication system. The off-board communication system may decrypt the encrypted message based on knowledge of the shared secret key, and the encryption key based on the cycle time that may be known by both the onboard communication system and the off-board communication system. Additionally or alternatively, the off-board communication system may generate an encrypted message by encrypting a message using the shared secret key and the encryption key. The off-board communication system may communicate the encrypted message with the onboard communication system. The onboard communication system may decrypt the encrypted message based on the knowledge of the shared secret key and the encryption key.

In one or more embodiments, the encrypted messages generated by the onboard communication system and/or the off-board communication system may include map data related to the route, may include updates to existing route data (e.g., route data stored and/or previously known onboard the vehicle system), vehicle system control information, vehicle operational data, infrastructure updates, collision avoidance information, or the like.

While some embodiments described herein relate to rail vehicle systems, positive train control systems, and wayside devices, not all embodiments of the inventive subject matter are restricted to rail vehicles, positive train control systems, or wayside devices. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. Additionally, the vehicle systems may include two or more different types of vehicles that may operate as a common vehicle system and that may communicate with each other via the off-board database. For example, the vehicle system may comprise a rail vehicle that may communicate with an unmanned aerial vehicle via the off-board database, or an aircraft that communicates with a marine vessel.

Figure 1:
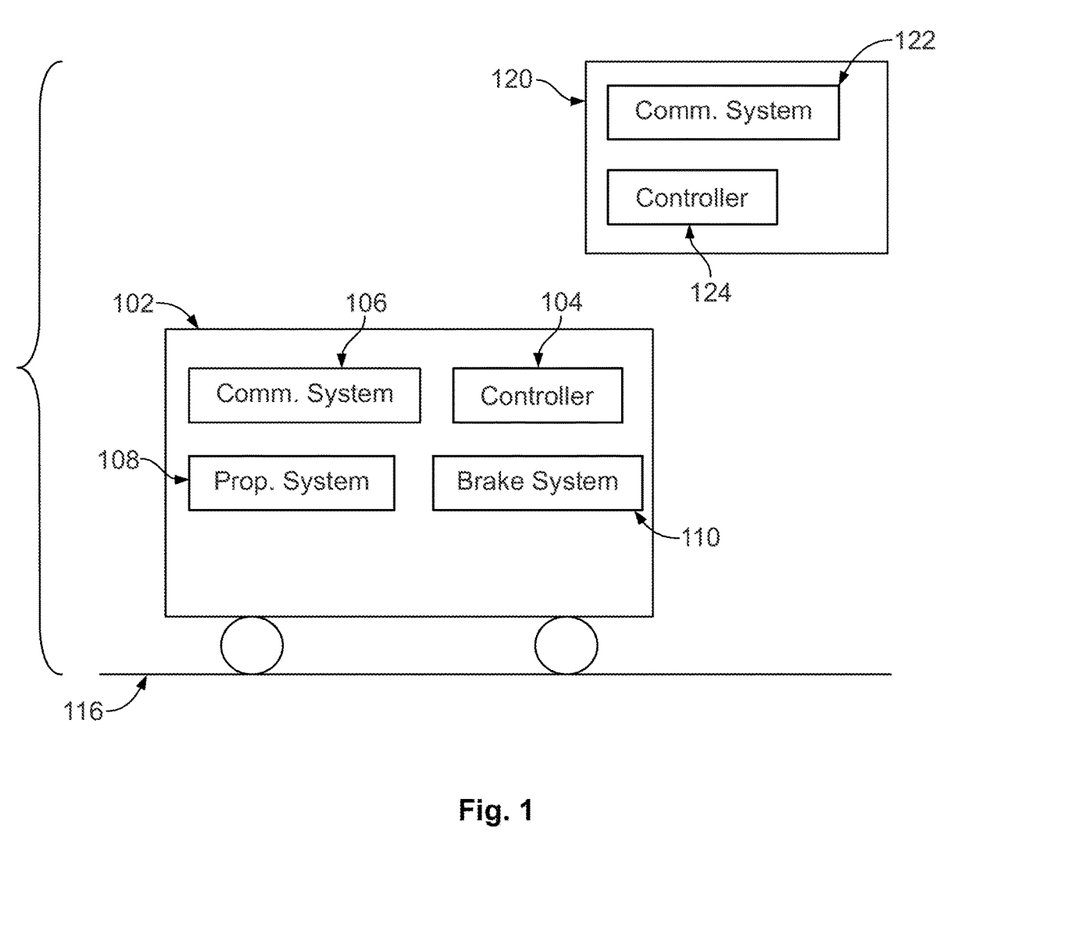
FIG. 1 schematically illustrates one example of a communication system.

FIG. 1 illustrates one example of a vehicle system 102. The vehicle system can be a rail vehicle system, but optionally can be automobiles, trucks, buses, mining vehicles, marine vessels, aircraft, agricultural vehicles, or other off-highway vehicles. The illustrated vehicle system includes a single vehicle, but optionally can be formed from two or more vehicles that may travel together (by being mechanically coupled or by being mechanically separate but communicating with each other to travel together, such as in a convoy). The vehicle system travels along a route 116, such as tracks, roads, highways, land-based paths, airborne paths, waterways, or the like.

The vehicle system includes a controller 104, which may be referred to as an onboard controller. The onboard controller can represent hardware circuitry that includes and/or is connected with one or more processors that perform operations described in connection with the onboard controller. The onboard controller can communicate with onboard and/or off-board components via an onboard communication system 106. The onboard communication system represents transceiving circuitry, one or more antennas, modems, or the like. In one or more embodiments, the onboard communication system may receive and provide the data signals to the onboard controller. Optionally, the onboard communication system can represent hardware circuitry that includes and/or is connected with one or more processors that perform operations described in connection with the onboard communication system. Optionally, the one or more processors of the onboard controller and the onboard communication system may operate together, in unison, or optionally the vehicle system may include one or more processors that may perform operations described in connection with the onboard controller and the onboard communication system. The onboard communication system may be the same as or similar to other communication devices described herein.

The vehicle system includes a propulsion system 108 that operates to move the vehicle system along the route. The propulsion system can represent one or more engines, motors, transmissions, propellers, or the like, that generate propulsion to move the vehicle system. The vehicle system also can include a brake system 110 that operates to slow or stop movement of the vehicle system. The brake system can include air brakes, friction brakes, motors (e.g., used for dynamic or regenerative braking), or the like. The onboard controller can communicate control signals with the propulsion system and/or the brake system to control or change movement of the vehicle system.

In one or more embodiments, the vehicle system may include one or more energy storage devices that store and/or generate electric current (not shown). This current can be used to power components onboard the vehicle system, such as the propulsion system, a lighting system, or the like. Optionally, the energy storage devices can include or represent one or more motors of the propulsion system and/or the brake system (e.g., where the motors generate current during regenerative braking). The energy storage devices can include one or more batteries, fuel cells, photovoltaic devices, flywheels, alternators, generators, or the like. The onboard controller can communicate control signals to the energy storage devices to control supply of the current to one or more components of the vehicle system.

An off-board control system 120 may communicate with the onboard controller of the vehicle system. The off-board control system may include an off-board controller 124 that can represent hardware circuitry that includes and/or is connected with one or more processors that perform operations of the off-board controller and/or the off-board control system. In one or more embodiments, the off-board controller can communicate with the onboard controller of the vehicle system to control or restrict movement of the vehicle system. For example, the off-board controller can communicate with the onboard controller of the vehicle system to notify the vehicle system where the vehicle system is allowed to travel, how fast the vehicle system is allowed to travel, or the like.

In one embodiment, the off-board controller may represent a back-office server of a positive vehicle control (PVC) system. A PVC system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board controller represents another computerized system that communicates with vehicle systems described herein.

The off-board control system may include an off-board communication system 122. The off-board communication system represents transceiving circuitry, one or more antennas, modems, or the like. In one or more embodiments, the off-board communication system may receive and provide the data signals to the off-board controller. Optionally, the off-board communication system can represent hardware circuitry that includes and/or is connected with one or more processors that perform operations described in connection with the off-board communication system. Optionally, the one or more processors of the off-board controller and the off-board communication system may operate together, in unison, or optionally the off-board control system may include one or more processors that may perform operations described in connection with the off-board controller and the off-board communication system. The off-board communication system may be the same as or similar to other communication devices described herein.

In one or more embodiments, the vehicle system and/or the off-board control system may include a memory or storage system (not shown). For example, a memory can store information about the vehicle system, the route, or the like. Nonlimiting examples of information that may be stored in the memory of the vehicle system and/or off-board control system may include identification of each of the vehicles of the vehicle system, identification of one or more off-board systems the vehicle system may communicate with based on a geospatial location of the vehicle system, route information such as location and types of wayside devices, intersection locations, switches, infrastructure information (e.g., bridges, caves, tunnels, or the like), permissible and/or prohibited areas of transit (e.g., air space, water-space, routes, or the like), existing map data, areas of unknown map data, vehicle operational settings of previous trips of the vehicle system, or the like. Optionally, the memory of the off-board control system may store information related to the vehicle system 102, as well as information related to other vehicle systems, such as, but not limited to, distances between the different vehicle systems, types of different vehicle systems, direction and/or speed of travel of the different vehicle systems, or the like.

Figure 2:
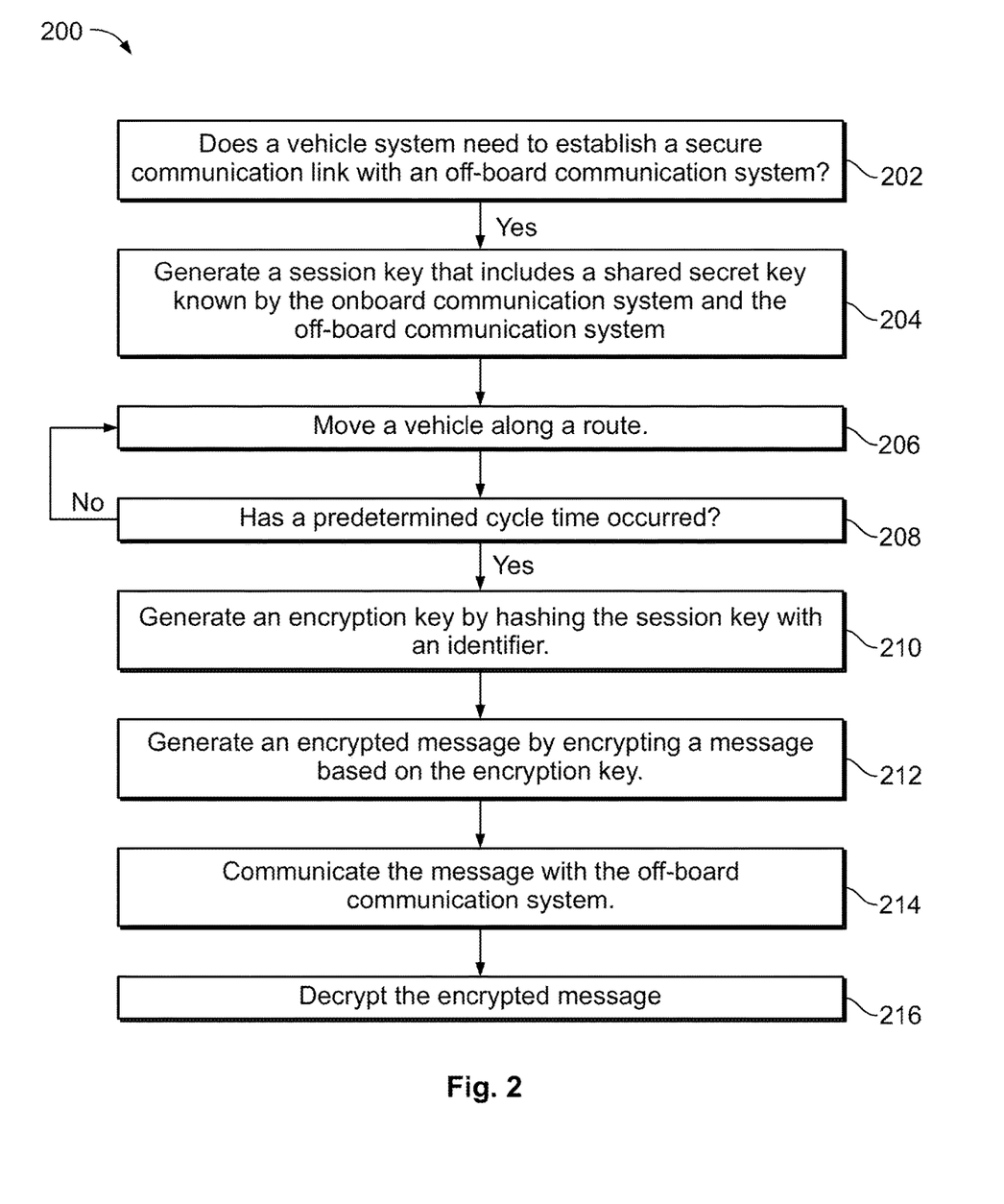
FIG. 2 illustrates a flowchart of a method of communicating using a secure communication system in accordance with one embodiment.

In one or more embodiments, before the vehicle system starts moving along a route and/or while the vehicle system is moving along the route, the vehicle system may need to communicate via a secure communication system with the off-board control system. For example, FIG. 2 illustrates a flowchart 200 of a method of communicating using a secure communication system in accordance with one embodiment. The flowchart illustrates one example of establishing a secure communication system between two or more systems. As one example, the flowchart of the method may be completed for securing communication between an onboard communication system that is disposed onboard a vehicle system, and an off-board communication system that is off-board the vehicle system. In one or more embodiments, the steps of the method may be performed in a different order, two or more steps may be completed at substantially the same time, one or more steps may be eliminated from the flowchart, or the like.

At 202, a decision is made whether a system needs to establish a secure wireless communication link with an off-board communication system, such as off-board communication system 122. In one or more embodiments, the system is a vehicle system, such as the vehicle system illustrated in FIG. 1. Optionally, the system may be another system having one or more processors and an onboard communication system.

As one example, the onboard communication system of the vehicle system may need to establish a secure communication link before the vehicle system moves along the route (e.g., before the vehicle system starts a trip, after the vehicle system stops and before the vehicle system starts moving again). As another example, the vehicle system may need to establish a secure communication link while the vehicle system is in transit (e.g., is moving along the route). For example, the vehicle system may need to communicate with a first off-board controller (e.g., a first back-office server) while the vehicle system is in a first geospatial position, and communicate with a different, second off-board controller (e.g., a second back-office server) while the vehicle system is in a second geospatial position. As another example, the vehicle system may need to establish a secure communication link after the vehicle system starts a trip, and before and/or after the vehicle system stops before reaching a final destination (e.g., makes a stop along the route between the starting position and final destination), such as when a vehicle system stops to unload cargo, stops for maintenance or repair, stops to adhere to rules or regulations, or the like. Optionally, the vehicle system may need to establish a secure communication link with the off-board controller for any alternative reason.

If a secure communication link needs to be established between an onboard communication system and an off-board communication, then flow of the method proceeds toward 204. If a secure communication link does not need to be established, flow of the method begins again based on one or more requirements. The one or more requirements may include, but may not be limited to, a length of time the vehicle system is in transit, a length of time expiring since the last time a decision was made (e.g., checks every 5 minutes, 30 minutes, 5 hours, 10 hours, or the like), based on a location of the vehicle system (e.g., a secure communication link may not be needed while the vehicle is in a first location, but may be needed responsive to the vehicle system reaching a second location), or the like.

At 204, a session key may be generated that includes a shared secret key that is known by the onboard communication system and the off-board communication system. In one or more embodiments, the one or more processors of the onboard communication system, and/or the one or more processors of the onboard controller may generate the session key that includes the shared secret key. Additionally, in one or more embodiments, the one or more processors of the off-board communication system and/or the one or more processors of the off-board controller may generate the session key that includes the shared secret key.

Figure 3:
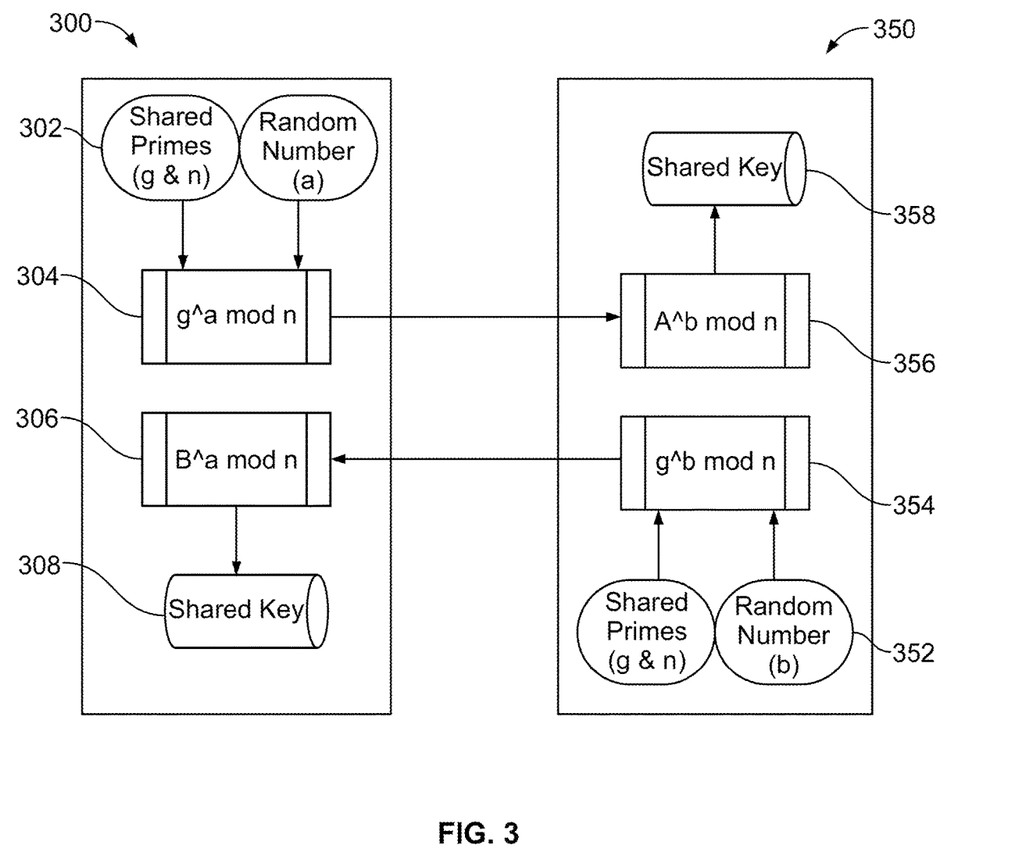
FIG. 3 illustrates a flowchart of one example of generating a session key in accordance with one embodiment.

FIG. 3 illustrates one example of a flowchart of one example of generating a session key that includes a shared secret key in accordance with one embodiment. A portion 300 of the flowchart may be completed or conducted by the onboard communication system, and a portion 350 of the flowchart may be completed or conducted by the off-board communication system. FIG. 3 illustrates a method of generating a Diffie-Hellman shared key between the two systems. The shared secret key may be established between the two systems without broadcasting the shared secret key between the two systems. For example, at 302, the memory of the onboard controller includes shared prime numbers "g" and "n" and includes or knows a random number "a". At 304, the onboard communication system calculates and/or determines a solution to Equation 1:

$$A = g^a \bmod n \qquad \text{Eq. 1}$$

The onboard communication system communicates the value for A with the off-board communication system.

Additionally, at 352, the off-board memory includes or knows shared prime numbers "g" and "n" and includes or knows a random number "b". At 354, the off-board communication system calculates and/or determines a solution to Equation 2:

$$B = g^b \bmod n \qquad \text{Eq. 2}$$

The off-board communication system communicates the value for B with the onboard communication system.

At 306, responsive to the onboard communication system receiving the value for B, the onboard communication system calculates and/or determines a solution to Equation 3:

$$\text{Shared Secret Key} = W \bmod n \qquad \text{Eq. 3}$$

Similarly, at 356, responsive to the off-board communication system receiving the value for A, the off-board communication system calculates and/or determines a solution to Equation 4:

$$\text{Shared Secret Key} = A^b \bmod n \qquad \text{Eq. 4}$$

At 308, the onboard communication system has generated a session key that includes the shared secret key. At 358, the off-board communication system has generated a session key that includes the same shared secret key as the onboard communication system. For example, responsive to the onboard communication system and the off-board communication establishing or determining the shared secret key, the onboard communication system and the off-board communication system may communicate secure messages between the onboard and off-board communication systems. The messages may include the shared secret key, such that the receiving communication system may verify that the message is being transmitted via a secure communication link. For example, a message generated by the onboard communication system to be transmitted to the off-board communication system may include the shared secret key, an identification of the vehicle system, an identification of the off-board control system, or any combination of two or more therein.

In one or more embodiments, the onboard communication system and the off-board communication system may generate the session key that includes the shared secret key while the vehicle system is moving along the route. Alternatively, the onboard and off-board communication systems may generate the session keys that includes the shared secret key while the vehicle system is moving, or in transit.

FIG. 3 illustrates one example of the onboard and off-board communication systems establishing a session key that includes a shared secret key using a Diffie-Hellmen method. Optionally, the onboard and off-board communication systems may establish a shared secret key using an alternative method or approach. Optionally, a shared secret key may be known by the two systems and stored in the respective memories. Optionally, a shared secret key or secret key may be communicated via a third system. Optionally, the shared secret key or secret key may be generated using any alternative method.

Returning to FIG. 2, at 206, the vehicle system moves along the route. At 208, a decision is made whether a predetermined cycle time has occurred. The cycle time may be based on a time and/or a location of the vehicle system. For example, the cycle time may be based on whether the vehicle system has moved a predetermined distance, has traveled a predetermined amount of time, based on a predetermined length of time expiring, or the like. In one or more embodiments, the vehicle system and the off-board controller may have clocks, timers, or other time-keeping devices that may be correlated or synced with each other. For example, the onboard and off-board communication systems may utilize or operate using Universal Coordinated Time (UTC). Optionally, the clocks and/or timers of the onboard and off-board communication systems may be otherwise substantially synced or coordinated with each other (e.g., within an amount of precision that may include a single unit of time, such as a single second, fraction of a second, or the like) by one or more alternative methods.

The cycle time may be known by both the onboard communication system and the off-board communication system. For example, for a cycle time being a predetermined length of time (e.g., every second, every five seconds, every ten seconds, every minute, every 30 minutes, every hour, every 2 hours, or the like), the onboard communication system and the off-board communication system may know that the cycle time may be the predetermined length of time. Optionally, for a cycle time being a location of the vehicle system, the onboard and off-board communication systems may track (e.g., via a global positioning system (GPS) or the like) movement of the vehicle system to know when the vehicle system is at a first location, and when the vehicle system is at a different, second location, such as a location that may identified as a cycle time location.

If the predetermined cycle time has not occurred, flow of the method returns to 206. Alternatively, if the cycle time has occurred then flow of the method proceeds toward 210. At 210, one or both of the onboard communication system and the off-board communication system may generate an encryption key by hashing the session key with an identifier that may be based on the cycle time (e.g., the cycle time moment in time, the cycle time location of the vehicle system, or the like). The encryption key may be based on an encryption algorithm associated with the cycle time. For example, the shared secret key may be modified by an encryption algorithm based on time, location, or the like.

As one example, the cycle time may be five seconds. Every five seconds, the onboard communication system and/or the off-board communication system may generate a new encryption key by hashing, encrypting, associating, coordinating, referencing, or the like, the session key with the cycle time identifier. For example, every five seconds, the one or more processors of the onboard and/or off-board communication systems may perform an algorithm on the shared secret key to produce a hash, checksum, or the like. Responsive to a timer reaching five seconds, the onboard communication system my generate an encryption key by hashing the shared secret key or session key with a first identifier (e.g., the first identifier being associated with the first five seconds), and responsive to the timer reaching ten seconds, the onboard communication system may generate a second encryption key by hashing the shared secret key or session key with a different, second identifier (e.g., the second identifier being associated with the second five seconds). For example, each encryption key may be generated by hashing the session key with a different identifier based on the cycle time.

The onboard and off-board communication systems may generate a first encryption key responsive to a clock or timer reaching five seconds, may generate a second encryption key responsive to the clock or timer reaching ten seconds, and may continue to generate different encryption keys while the vehicle system is in transit, for a predetermined length of time, until the vehicle system travels a predetermined distance, until the vehicle system reaches a predetermined destination, or the like.

At 212, the onboard and/or off-board communication systems may generate an encrypted message by encrypting a message to be communicated with the other of the onboard or off-board communication systems. The message may be encrypted based on the encryption key. For example, the onboard communication system may need to communicate a message with the off-board communication system. The cycle time may be five seconds, and the clock or timer may be at 12 seconds. Therefore, the onboard communication system has generated a first encryption key responsive to the timer reaching five seconds, and a second encryption key responsive to the timer reaching ten seconds. The onboard communication system may encrypt a message based on the second encryption key.

One technical problem with existing secure communication systems is that once a shared secret key is established, the vehicle system may communicate with the off-board communication system for a length of time using only the single form of security. For example, the shared key may be the only safeguard in place to ensure secure communication. In the example of the vehicle system communicating with an off-board control system, the vehicle system may communicate with the off-board control system during the entire length of time that the vehicle system is traveling, that may be minutes, hours, or even days. A motivated individual may easily defeat the security system having only the single shared key safeguard in place.

Alternatively, the encrypted message generated at step 212 may be secured via two different security measures. For example, the encrypted message is encrypted based on the shared secret key or session key, and is encrypted based on the encryption key. The shared secret key may remain the same for the time in which the vehicle system may communicate with the off-board control system (e.g., while the vehicle system is in transit, until the vehicle system reaches a destination, until the vehicle system ends a communication session with the off-board control system, or the like). Alternatively, the encryption key may change based on the predetermined cycle time, that may be based on a time and/or location of the vehicle system. For example, the encryption key may change every second, every five seconds, every minute, every thirty minutes, or the like. Optionally, the encryption key may change based on the vehicle system traveling one mile, five miles, ten miles, fifty miles, or the like. Optionally, the encryption key may be changed based on the vehicle system moving past one or more predetermined markers, from one geospatial area into another (e.g., crossing a county line, a state line, moving from one country into another, or the like).

In one or more embodiments, the encryption algorithm may be known by both the onboard communication system and the off-board communication system. In one or more embodiments, the algorithm may be based on the identification of the vehicle system, for example a first vehicle may operate to generate encrypted messages using a first algorithm, and a second vehicle may operate to generate encrypted messages using a different, second algorithm. Optionally, the vehicle system may operate to generate encrypted messages using a first algorithm responsive to the vehicle system communicating with a first off-board communication system, and the vehicle system may operate to generate encrypted messages using a second algorithm responsive to the vehicle system communicating with a different off-board communication system.

In one or more embodiments, the one or more encrypted messages may be associated with the vehicle system, the route over which the vehicle system is configured to move (e.g., a portion of the route that the vehicle system has traversed and/or a portion of the route that the vehicle system is to traverse), or the like. The encrypted messages may include map data related to the route over which the vehicle system is configured to move, updates to existing map data previously known onboard the vehicle system, vehicle system control information, vehicle operational data (e.g., brake settings, propulsion settings, or the like), infrastructure information and/or updates (e.g., a new bridge where there was not one before, changes to lane configurations of a route, updated prohibited and/or permissible travel space, updates to intersections, updates to switches, or the like), route health information (e.g., a closed route for repair, detour information, or the like), collision avoidance information (e.g., detour information, reduced speed directions, or the like), or the like. Optionally, the encrypted messages may be related to any other aspect of the vehicle system, the route, the off-board control system, other vehicles that may travel the same route, other vehicles that may travel other routes that may intersect with the route, or the like.

At 214, responsive to generating an encrypted message, the onboard communication system may communicate the encrypted message with the off-board communication system. In one or more embodiments, the encrypted messages may be generated by the onboard communication system and communicated to the off-board communication system. Additionally or alternatively, the off-board communication system may encrypt messages and communicate the encrypted messages with the on-board communication system. Optionally, the onboard communication system and the off-board communication system may generate and communicate encrypted messages with each other and/or with one or more other communication systems, such as a wayside device communication system, or the like. In one or more embodiments, the onboard communication system may receive encrypted messages from two or more different systems (e.g., the off-board communication system and a wayside device communication system). Optionally, two or more communication systems may generate and communicate encrypted messages with each other.

At 216, the onboard communication system and/or the off-board communication system may decrypt the encrypted message. As one example, the encrypted message may be decrypted based on one or more of the known shared secret key, the cycle time, the identifier (e.g., used at step 210 of the method), an identification of the vehicle system, an identification of the off-board communication system or off-board control system, the encryption key and/or the encryption algorithm, or the like. The encrypted message may be decrypted by un-hashing, breaking down, disassociating, or the like, the message from the encryption key and the shared secret key.

In one or more embodiments, the onboard communication system and/or the off-board communication system may encrypt one or more messages, and may communicate the one or more encrypted messages with the other of the onboard communication system or the off-board communication system. The onboard and/or off-board communication systems may decrypt the one or more messages. In one or more embodiments, the encrypted messages may include one or more commands or command signals that may be used to control movement of the vehicle system, that may be used to control one or more systems (e.g., propulsion system, braking system, directions for controlling the different vehicles of the vehicle system, or the like), or the like. For example, the off-board communication system may encrypt and communicate a first encrypted message with the onboard communication system that may direct the vehicle system how to control movement of the vehicle system.

Additionally, the off-board communication system may encrypt and communicate a second encrypted message with other onboard communication system of other vehicle systems that may direct the other vehicle system how to control movement of the other corresponding vehicle system. The second encrypted message may be based on information received from the vehicle system. For example, the off-board communication system may receive and decrypt an encrypted message from the vehicle system that there is a problem with the route, that the vehicle system had to change operating controls, that a wayside device is malfunctioning, or the like. The off-board communication system may encrypt and communicate a new encrypted message with other vehicle system directing the other vehicle system to avoid the area of the route that includes a problem, to move toward the malfunctioning wayside device to repair the malfunctioning wayside device, or the like.

In one or more embodiments, a system includes an onboard communication system configured to be disposed onboard a vehicle system and comprising one or more processors. The one or more processors may generate a session key that includes a shared secret key that is known by the onboard communication system and an off-board communication system, generate one or more encryption keys by hashing the session key with an identifier based on a cycle time that is known by the onboard communication system and the off-board communication system, generate one or more encrypted messages by encrypting one or more messages associated with one or more of the vehicle system or a route over which the vehicle system moves based on the one or more encryption keys, and communicate the one or more encrypted messages from the onboard communication system to the off-board communication system.

Optionally, the one or more processors may generate each of the one or more encryption keys by hashing the session key with a different identifier based on the cycle time.

Optionally, the cycle time may be based on one or more of a time or location of the vehicle system.

Optionally, the one or more processors may generate a first encryption key of the one or more encryption keys based on one or more of a first time or a first location of the vehicle system, and the one or more processors may generate a second encryption key of the one or more encryption keys based on one or more of a second time or a second location of the vehicle system.

Optionally, the onboard communication system may generate the session key while the vehicle system is stationary or moving along the route.

Optionally, the one or more processors may generate a first encryption key of the one or more encryption keys by hashing the session key with a first identifier based on a first time of the cycle time, and the one or more processors may generate a second encryption key of the one or more encryption keys by hashing the session key with a second identifier based on a second time of the cycle time.

Optionally, the onboard communication system may receive one or more off-board encryption messages from the off-board communication system.

Optionally, the onboard communication system may decrypt the one or more off-board encryption messages based on the cycle time, the one or more encryption keys, or the session key.

Optionally, the onboard communication system may decrypt the one or more off-board encryption messages based on one or more of the session key, the cycle time, or the identifier.

In one or more embodiments, a method includes generating a session key that includes a shared secret key that is known by an onboard communication system and an off-board communication system. The onboard communication system disposed onboard a vehicle system, generating one or more encryption keys by hashing the session key with an identifier based on a cycle time that is known by the onboard communication system and the off-board communication system, generating one or more encrypted messages by encrypting one or more messages associated with one or more of the vehicle system or a route over which the vehicle system moves based on the one or more encryption keys, and communicating the one or more encrypted messages from the onboard communication system to the off-board communication system.

Optionally, the method may include generating each of the one or more encryption keys by hashing the session key with a different identifier based on the cycle time.

Optionally, the method may include generating a first encryption key of the one or more encryption keys based on one or more of a first time or a first location of the vehicle system, and generating a second encryption key of the one or more encryption keys based on one or more of a second time or a second location of the vehicle system.

Optionally, the cycle time may be based on one or more of a time or a location of the vehicle system.

Optionally, the method may include generating the session key while the vehicle system is stationary or moving along the route.

Optionally, the method may include generating a first encryption key of the one or more encryption keys by hashing the session key with a first identifier based on a first time of the cycle time, and generating a second encryption key of the one or more encryption keys by hashing the session key with a second identifier based on a second time of the cycle time.

Optionally, the method may include receiving one or more off-board encryption messages from the off-board communication system.

Optionally, the method may include decrypting the one or more off-board encryption messages based on one or more of the cycle time, the one or more encryption keys, or the session key.

Optionally, the method may include decrypting the one or more off-board encryption messages based on one or more of the session key, the cycle time, or the identifier.

In one or more embodiments, a method for securing communication between an onboard communication system and an off-board communication system, the onboard communication system being disposed onboard a vehicle system. The method includes generating one or more encryption keys based at least in part on information that is known by both the onboard communication system and the off-board communication system, generating one or more encryption messages by encrypting one or more messages associated with one or more of the vehicle system or a route over which the vehicle system moves based on the one or more encryption keys, and communicating the one or more encrypted messages between the onboard communication system and the off-board communication system, the one or more encrypted messages including information about one or more of the vehicle system or the route over which the vehicle system is configured to move.

Optionally, the one or more encrypted messages may include one or more of map data related to the route over which the vehicle system moves, updates to existing map data previously known onboard the vehicle system that relates to the route over which the vehicle system moves, vehicle system control information, vehicle operational data, infrastructure updates, or collision avoidance information.

Optionally, the method may include decrypting the one or more encrypting messages by the off-board communication system, and generating a first new encrypted message to be communicated to one or more of the vehicle system or another vehicle system. The first new encrypted messages including one or more command messages for one or more of controlling movement of the vehicle system or the other vehicle system, or controlling one or more systems of the vehicle system or the other vehicle system.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   an onboard communication system configured to be disposed onboard a vehicle system and comprising one or more processors, the one or more processors configured to:
   generate a session key that includes a shared secret key that is known by the onboard communication system and an off-board communication system disposed off-board of the vehicle system;
   generate one or more encryption keys by hashing the session key with an identifier responsive to the vehicle system completing a cycle time, the identifier being based on the cycle time, wherein the cycle time is based on a predetermined characteristic of one or more of a time or location of the vehicle system, wherein the cycle time is known by the onboard communication system and the off-board communication system;
   generate one or more encrypted messages by encrypting one or more messages associated with one or more of the vehicle system or a route over which the vehicle system is configured to move based on the one or more encryption keys; and
   communicate the one or more encrypted messages from the onboard communication system to the off-board communication system.

2. The system of claim 1, wherein the one or more processors are configured to generate each of the one or more encryption keys by hashing the session key with a different identifier based on the cycle time.

3. The system of claim 1, wherein the cycle time is based on one or more of the time of operation of the vehicle system or the vehicle system reaching a predetermined location along the route.

4. The system of claim 1, wherein the one or more processors are configured to generate a first encryption key of the one or more encryption keys responsive to vehicle system completing one or more of a first time or a first location of the vehicle system, and the one or more processors are configured to generate a second encryption key of the one or more encryption keys responsive to the vehicle system completing one or more of a second time or a second location of the vehicle system.

5. The system of claim 1, wherein the onboard communication system is configured to generate the session key while the vehicle system is stationary or moving along the route.

6. The system of claim 1, wherein the one or more processors are configured to generate a first encryption key of the one or more encryption keys by hashing the session key with a first identifier responsive to the vehicle system completing operating for a first length of time, and the one or more processors are configured to generate a second encryption key of the one or more encryption keys by hashing the session key with a second identifier responsive to the vehicle system completing operating for a second length of time.

7. The system of claim 1, wherein the onboard communication system is configured to receive one or more off-board encryption messages from the off-board communication system.

8. The system of claim 7, wherein the onboard communication system is configured to decrypt the one or more off-board encryption messages based on one or more of the cycle time, the one or more encryption keys, or the session key.

9. The system of claim 7, wherein the onboard communication system is configured to decrypt the one or more off-board encryption messages based on one or more of the session key, the cycle time, or the identifier.

10. A method comprising:
generating a session key that includes a shared secret key that is known by an onboard communication system and an off-board communication system disposed off-board a vehicle system, the onboard communication system disposed onboard the vehicle system;
generating one or more encryption keys responsive to the vehicle system completing a cycle time, the one or more encryption keys being generated by hashing the session key with an identifier, the identifier being based on the cycle time, wherein the cycle time is based on a predetermined characteristic of one or more of a time or location of the vehicle system, wherein the cycle time is known by the onboard communication system and the off-board communication system;
generating one or more encrypted messages by encrypting one or more messages associated with one or more of the vehicle system or a route over which the vehicle system is configured to move based on the one or more encryption keys; and
communicating the one or more encrypted messages from the onboard communication system to the off-board communication system.

11. The method of claim 10, further comprising generating each of the one or more encryption keys by hashing the session key with a different identifier based on the cycle time.

12. The method of claim 10, further comprising generating a first encryption key of the one or more encryption keys responsive to the vehicle system completing one or more of a first time or a first location of the vehicle system, and generating a second encryption key of the one or more encryption keys responsive to the vehicle system completing one or more of a second time or a second location of the vehicle system.

13. The method of claim 10, wherein the cycle time is based on one or more of the time of operation of the vehicle system or the vehicle system reaching a predetermined location along the route.

14. The method of claim 10, further comprising generating the session key while the vehicle system is stationary or moving along the route.

15. The method of claim 10, further comprising generating a first encryption key of the one or more encryption keys by hashing the session key with a first identifier responsive to the vehicle system completing operating for a first length of time, and generating a second encryption key of the one or more encryption keys by hashing the session key with a second identifier responsive to the vehicle system completing operating for a second length of time.

16. The method of claim 10, further comprising receiving one or more off-board encryption messages from the off-board communication system.

17. The method of claim 16, further comprising decrypting the one or more off-board encryption messages based on one or more of the cycle time, the one or more encryption keys, or the session key.

18. The method of claim 16, further comprising decrypting the one or more off-board encryption messages based on one or more of the session key, the cycle time, or the identifier.

19. A method for securing communication between an onboard communication system and an off-board communication system disposed off-board a vehicle system, the onboard communication system being disposed onboard the vehicle system, the method comprising:
generating one or more encryption keys responsive to the vehicle system operating for a predetermined length of time by hashing a session key with an identifier, the session key including a shared secret key that is that is known by both the onboard communication system and the off-board communication system, the identifier being based on the vehicle system operating for the predetermined length of time, the predetermined length of time being based on a predetermined characteristic of one or more of a time or location of the vehicle system;
generating one or more encryption messages by encrypting one or more messages associated with one or more of the vehicle system or a route over which the vehicle system is configured to move based on the one or more encryption keys; and
communicating the one or more encrypted messages between the onboard communication system and the off-board communication system, wherein the one or more encrypted messages include information about one or more of the vehicle system, or the route over which the vehicle system is configured to move.

20. The method of claim 19, further comprising:
decrypting the one or more encrypted messages by the off-board communication system; and
generating a first new encrypted message to be communicated to one or more of the vehicle system or another vehicle system, wherein the first new encrypted message comprises one or more command messages for one or more of controlling movement of the vehicle system or the other vehicle system, or controlling one or more systems of the vehicle system or the other vehicle system.

* * * * *